United States Patent [19]

Gambetti

[11] Patent Number: 5,667,055
[45] Date of Patent: Sep. 16, 1997

[54] DEVICE FOR ALIGNING AND SPACING UP GROUPS OF OBJECTS, SUCH AS CANS, BOTTLES AND THE LIKE

[75] Inventor: Mario Gambetti, Crevalcore, Italy

[73] Assignee: Baumer S.R.L., Castelfranco Emilia, Italy

[21] Appl. No.: 581,564

[22] PCT Filed: May 16, 1995

[86] PCT No.: PCT/IB95/00366

§ 371 Date: Jan. 16, 1996

§ 102(e) Date: Jan. 16, 1996

[87] PCT Pub. No.: WO95/31390

PCT Pub. Date: Nov. 23, 1995

[30] Foreign Application Priority Data

May 16, 1994 [IT] Italy ................... BO94A0215

[51] Int. Cl.⁶ .................................................. B65G 47/26
[52] U.S. Cl. ................................ 198/419.3; 198/418.7
[58] Field of Search ..................... 198/418.7, 419.2, 198/419.3, 460.3, 461.1, 462.1, 462.3

[56] References Cited

U.S. PATENT DOCUMENTS

| | | | |
|---|---|---|---|
| 3,482,674 | 12/1969 | Wisemann. | |
| 4,759,433 | 7/1988 | Kraft | 198/418.7 |
| 5,020,655 | 6/1991 | Cruver | 198/419.3 |

FOREIGN PATENT DOCUMENTS

| | | | |
|---|---|---|---|
| 324 953 | 9/1975 | Austria. | |
| 2145339 | 3/1973 | Germany | 198/419.3 |

Primary Examiner—James R. Bidwell
Attorney, Agent, or Firm—McAulay Fisher Nissen Goldberg & Kiel, LLP

[57] ABSTRACT

A device for aligning and/or longitudinally spacing up and accumulating ranks (2a) of transversely arranged articles (2) is described which is, particularly suitable for packaging lines of cans, bottles and similar articles (2). The device has first driven transversal thrust bars (12a), able to affect and push the upstream transversal ranks (2ac) of each group (200) of articles along a pushing path extending upstream to downstream of the device; second driven transversal thrust bars (13a), fit to affect and push the remaining transversal ranks (2ab, 2aa) turned towards the groups (200) head, along a first stretch of a pushing path located in the operating area of the pushing path of the mentioned first bars.

14 Claims, 4 Drawing Sheets

DEVICE FOR ALIGNING AND SPACING UP GROUPS OF OBJECTS, SUCH AS CANS, BOTTLES AND THE LIKE

TECHNICAL FIELD

The present invention relates to a device for aligning and/or for spacing out and for longitudinally accumulating ranks of transversely arranged articles, particularly suitable to for use in the packaging lines of articles such as cans, bottles or the like, whenever longitudinally spacing out successive transversal ranks of articles is required, in order to insert a partition element there between.

BACKGROUND ART

Presently, several devices to achieve a longitudinal spacing between transversal ranks of articles are known.

For instance, patent document IT-927.943 substantially discloses a closed loop conveyor, provided with thrust bars, orbiting in a vertical closed loop longitudinally extending upstream to downstream and surrounding the articles transport path. Thrust bars are driven at a constant speed and provide to route pre-formed groups of articles along a straight translation path comprising, arranged upstream to downstream: a first sliding surface, the upper branch of a closed path transport tape conveyor, and a second sliding surface, where the transport tape has a linear speed greater than that of the thrust bars.

When a group of articles is transferred by the thrust bars from the first sliding surface to the transport tape, transversal ranks of articles, because of the difference in longitudinal speed existing between bars and tape, are sequentially accelerated toward downstream with a speed equal to that of the tape, so achieving a longitudinal spacing between the transversal ranks of articles, that allows a partition element to be inserted between them.

Successively, the transversal ranks of articles are transferred via the transport tape to the second sliding surface, passing from the maximum speed down to zero speed, to be then accumulated on said second Sliding surface, consequently to the conveyance of the following transversal ranks, by means of the transport tape and the bar. Said bar, coming from the back, transports the group downstream for all further operation.

A first drawback of such a device is that the articles acceleration and deceleration, obtained by means of a force applied at their bottom end (the acceleration occurring on the transport tape and the deceleration on the second sliding surface), causes the article to upset, respectively in an upstream and downstream direction.

A further drawback is that during the deceleration phase occurring on said second sliding surface, the articles belonging to a group can violently bump one against the other and, although they are equipped with partition elements, this can damage or even break them, especially in the case where they are glass bottles or cans.

Moreover, it must be noted that, in order to reduce the occurrence of the above mentioned drawbacks, the device must slow down its operating speed, accordingly reducing its productive capacity.

A second device longitudinally spacing up transversal ranks of articles is described in patent document IT-1.543.364.

Said device substantially describes a sliding surface provided with longitudinal shims, on which a flow of transversely and longitudinally ranged articles is routed, and a plurality of a transversal rows of pegs, carried by respective transversal bars, said bars being supported by an underlying chain conveyor, having chains wrapping in a closed loop on respective parallel vertical planes. According to the device arrangement, said pegs follow a closed loop vertical orbit, whose upper branch acts in the operating area of the articles translating path.

The device operates by vertically inserting the pegs, from the bottom upwards, between the articles moving on the sliding surface. Near the downstream end of the chain conveyor, the upper end of said pegs is inclined downstream, providing for a slight spacing between the transversal article ranks.

That device has its drawback in achieving only a small longitudinal spacing between the transversal ranks, and only for a short while, so that the transversal partition element must be inserted in a very fast and accurate way.

DISCLOSURE OF THE INVENTION

It is an object of the present invention to eliminate the above mentioned drawbacks. The invention, as it is characterized by the claims, solves the problem of designing a device to align and/or to space out and longitudinally accumulate ranks of transversely arranged articles, which device is particularly suitable for packaging lines for cans, bottles and the like.

One more object of the present invention, according to the above one, is to provide for a simply manufacturable, quickly usable device, as well as for a device which is able to operate at high speed rates.

A further object of the present invention is to provide a device whose operating means are exclusively arranged over the articles transport path.

By such a device, the following results are achieved: articles are not roughly accelerated and decelerated by means of a force applied on their bottom end; articles are not allowed to violently bump one against the other; a correct spacing between transversal ranks can be obtained.

Advantages which can be achieved with the present invention essentially consist in that articles do not longitudinally upset in a downstream or upstream direction, in that articles are not damaged because of bumps, in that the operation for inserting a partition element is easier, and in that it is possible to speed up the article transfer, so achieving a better machine productivity.

A further advantage of the present invention is to obtain an area underlying the article transport path which is free from device operating means which provide for spacing the transversal ranks.

BRIEF DESCRIPTION OF THE DRAWINGS

Further features and advantages of the present invention will be more obvious in the following detailed description of a preferred embodiment, exclusively described for illustrative and not limiting purposes, with reference to the enclosed drawings, in which.

BEST MODE OF CARRYING OUT THE INVENTION

Figure 1:
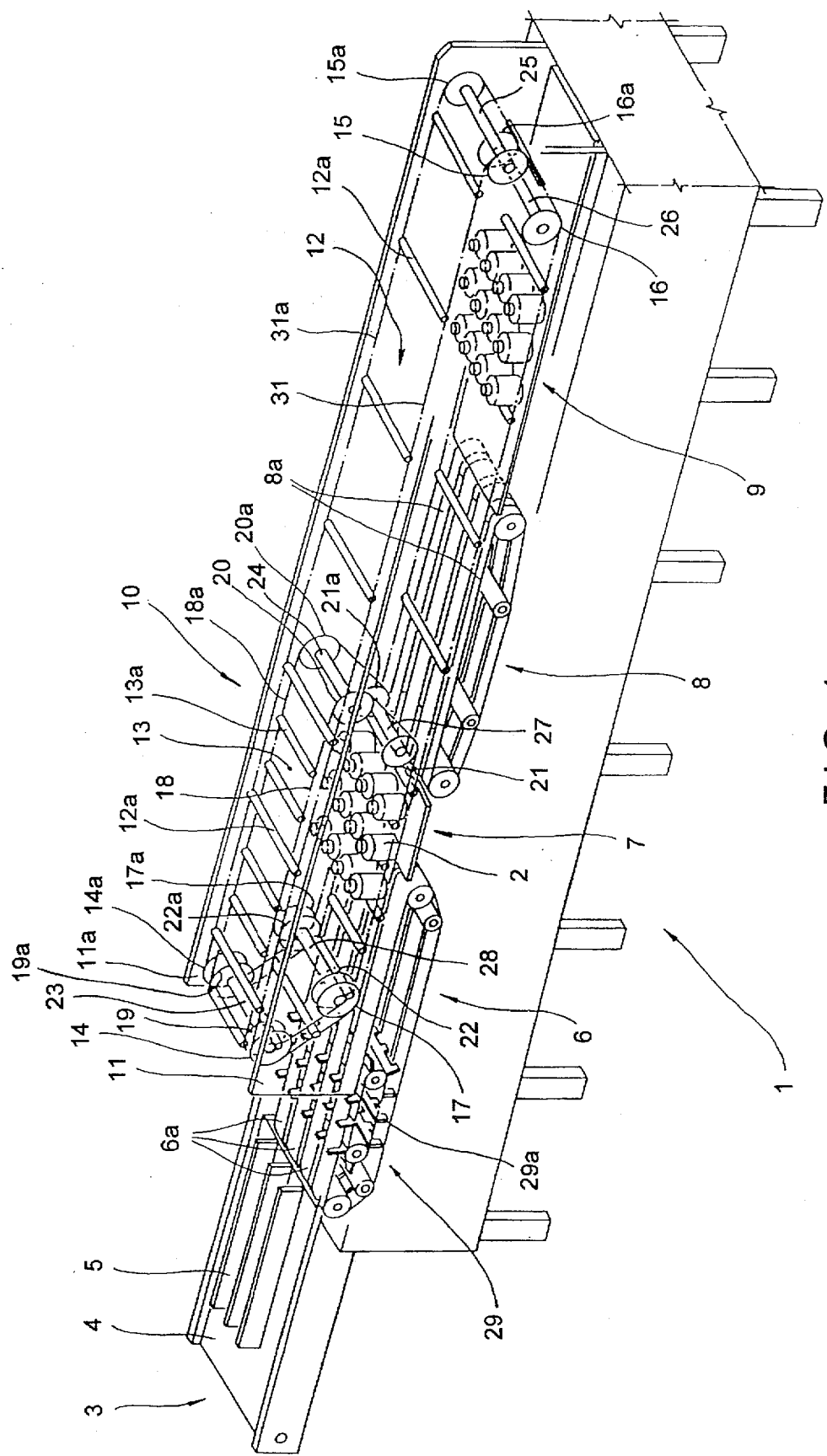
FIG. 1 is a schematic perspective view of a packaging machine where the device of the present invention is applied.
Figure 1A:
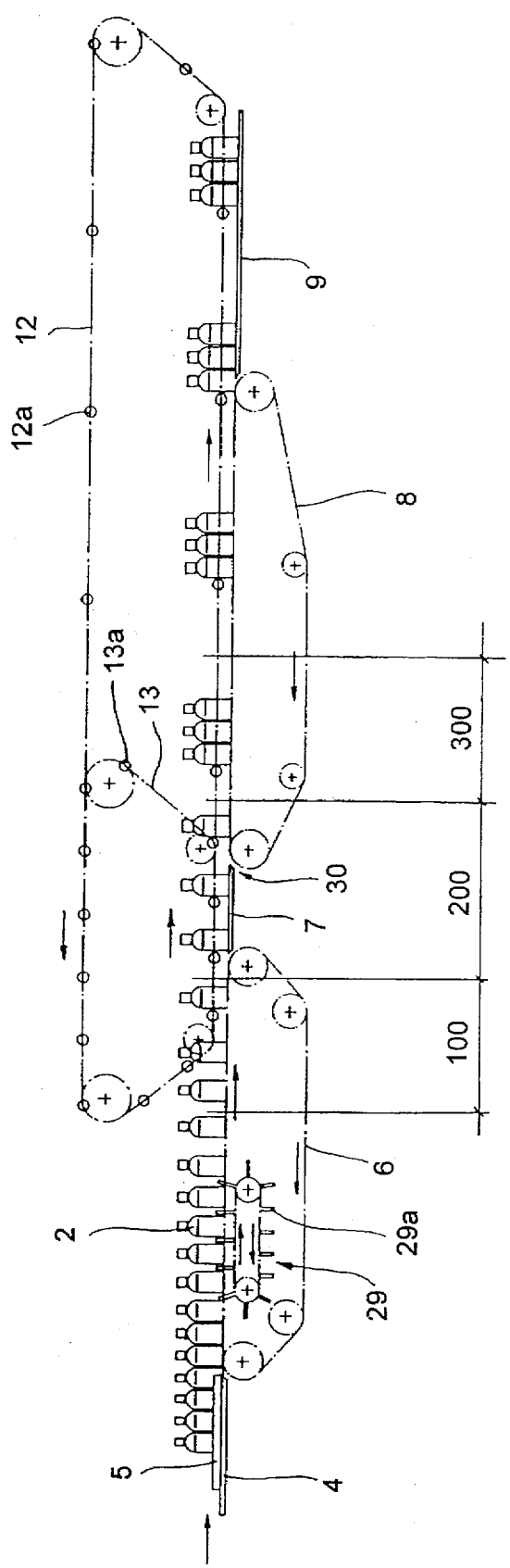
FIG. 1A is an schematic front view of the machine of FIG. 1 in an operating phase.

Referring to FIG. 1, the machine 1 is provided with an articles transport surface, comprising: an upstream end 3, from which originates a first articles sliding surface 4, provided with a plurality of guides 5 of known type; a first conveyor 6 with multiple belts 6a wrapped in a closed path; a second sliding surface 7; a conveyor 8 with multiple belts 8a wrapped in a closed path; a third sliding surface 9. The conveyor 8 may be a tape conveyor.

Figure 2:
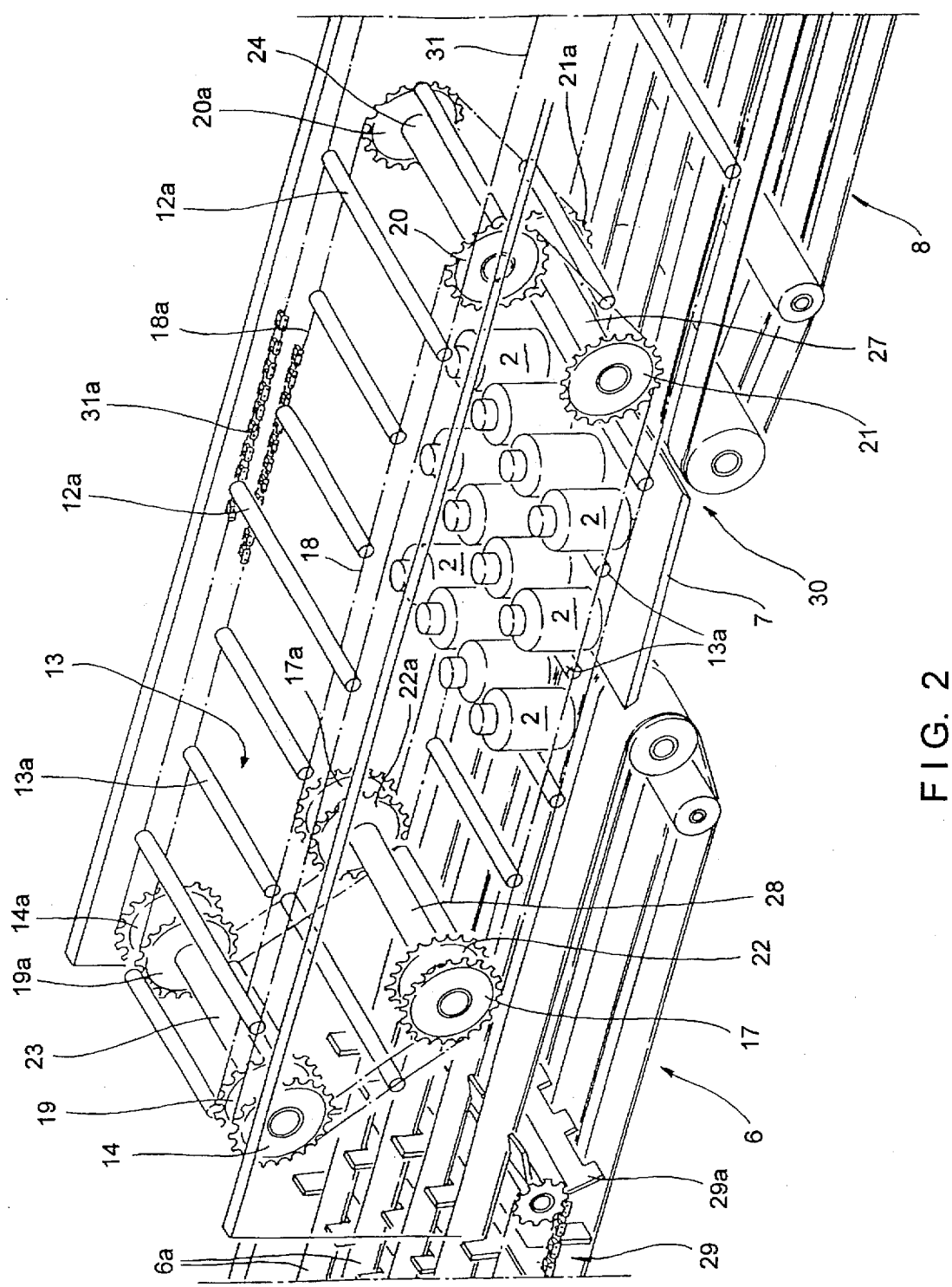
FIG. 2 is an enlarged perspective view of a portion of the device of the present invention.
Figure 2A:
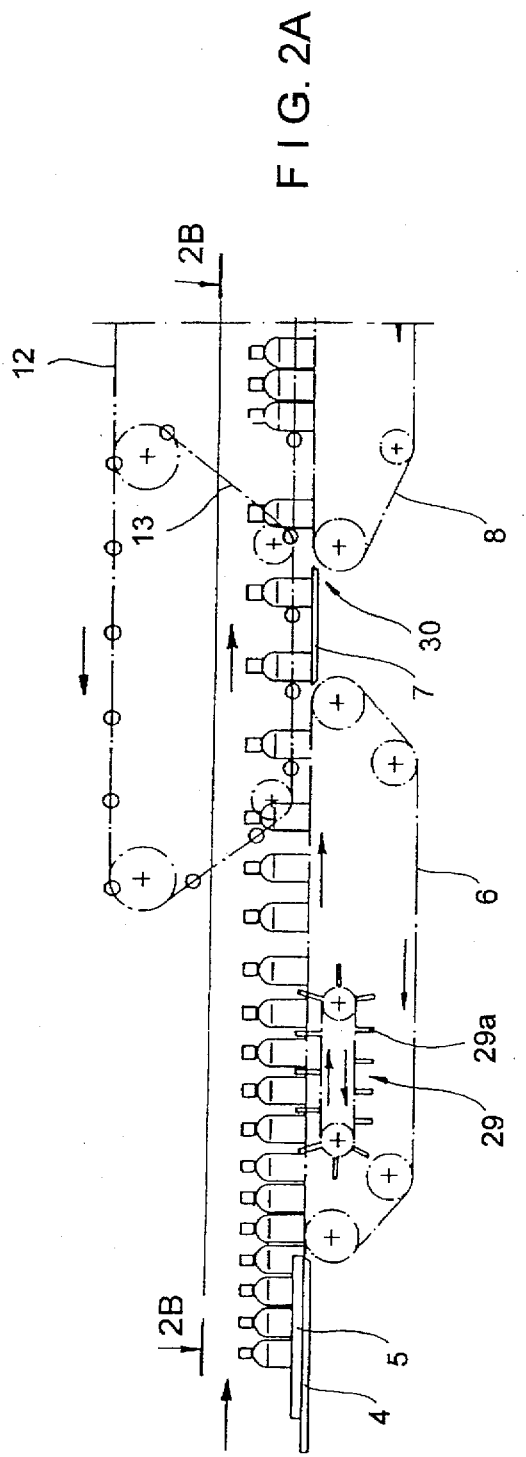
FIG. 2A is a schematic front view of FIG. 2, in an operating phase.
Figure 2B:
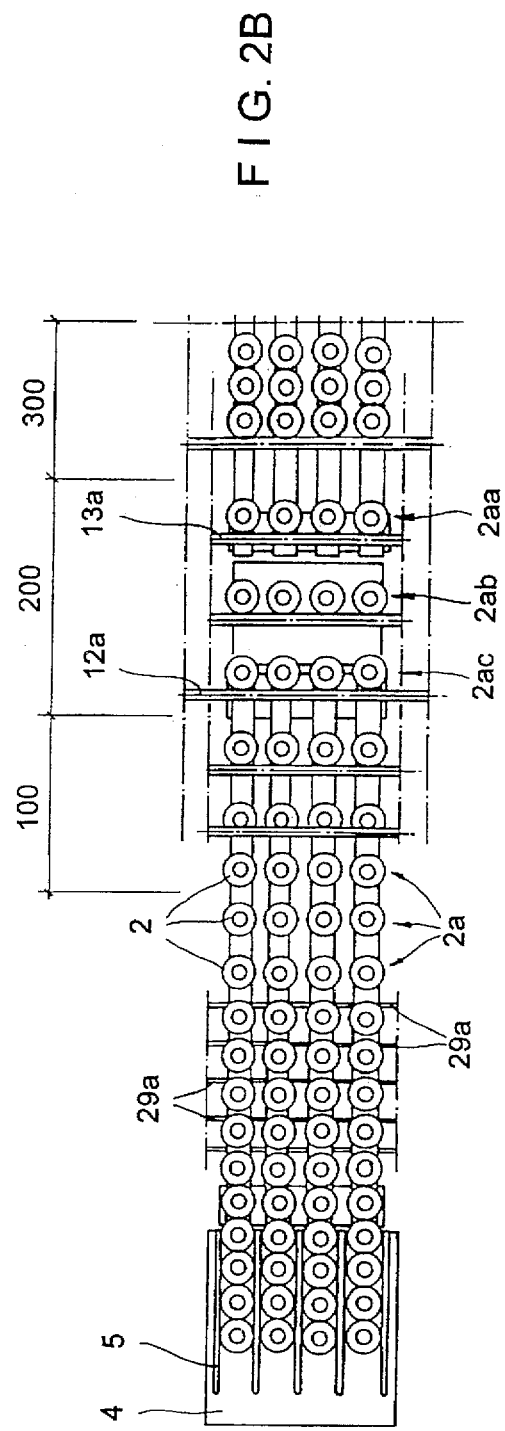
FIG. 2B is a schematic top view of an operating phase according to the line B—B of FIG. 2A.

The upper portion of the machine 1 (see FIG. 2) is provided with the device 10 of the present invention.

That device is equipped with a first closed loop external conveyor 12, supported by side vertical shoulders 11, 11a, said external conveyor 12 comprising a couple of chains or belts 31,31a, carrying a plurality of transversal thrust bars 12a, wherein said chains or belts 31,31a are wrapped in a closed loop in respective vertical planes on respective wheels 14, 15, 16, 17 and 14a, 15a, 16a, 17a, defining for said bars 12a a closed loop vertical orbital path, whose lower branch provides for transporting articles 2 on the machine 1 from upstream to downstream.

Inside the conveyor 12 another, similar conveyor 13 is provided, with transversal thrust bars 13a, having a longitudinal extension less than the above mentioned conveyor 12 and arranged in a way that said bars 13a, during their orbital path along the lower branch, act in the operating area of the orbital path of the bars 12a of the conveyor 12.

More particularly, the conveyor 13 is provided with a couple of chains or belts 18,18a, wrapped in a closed path on respective vertical planes on respective wheels 19, 20, 21, 22 and 19a, 20a, 21a and 22a; the chains or belts wrapping vertical planes 18,18a are arranged between the wrapping vertical planes of chains 31,31a.

The above mentioned wheels are carried by shafts 23, 24, 25, 26 and 27, transversely arranged and pivoted on the shoulders 11, 11a, where: shaft 23 supports the gear wheels 14, 19, 14a, 19a; shaft 26 supports the wheels 16, 16a; shaft 27 supports the wheels 21, 21a; and shaft 28 supports the wheels 17, 22, 17a, 22a.

The area underlying the transport plane is provided with a conveyor 29 of a known type, carrying transversal ranks of lugs 29a, which are able to introduce between the belts 6a of the conveyor 6.

The machine 1, again in said zone underlying the transport plane, can be provided with several upstream operating apparatuses, for instance with an apparatus for inserting transversal partition elements, as disclosed in an Italian patent application N. BO94A 000215, filed by the same Applicant at the same date. These apparatuses are not shown because they are not the subject of the present invention.

Particularly referring to FIGS. 1A, 2, 2A and 2B, transversal ranks 2a of articles 2 are released by lugs 29a near the downstream end of the conveyor 29 and, since said conveyor 29 moves at a lower speed than conveyor 6, transversal ranks 2a of articles 2 are slightly spaced.

The flow of articles 2, which is arranged in slightly longitudinally spaced transversal ranks 2a, is then routed downstream by means of belts 6a and the bars 12a and 13a, which are synchronised in a right phase relationship with said flow, lower along the downstream vertical stretch of the common orbital path, and introduce between the transversal ranks 2a of articles 2.

It must be noted, particularly referring to group 200, that the above mentioned introducing provides that a bar 13a is inserted between the heading transversal rank 2aa and the intermediate transversal rank 2ab, that a bar 13a is inserted between the intermediate transversal rank 2ab and the rear transversal rank 2ac, and that a bar 12a is inserted between the rear transversal rank 2ac and the heading transversal rank 2a of the following group 100 of articles.

Each group 100 or 200 is so engaged by bars 13a, 13a and 12a, which bars push each rank 2a, along the downwards horizontal stretch of the common orbital path, on the sliding surface 7, keeping the desired longitudinal spacing and phase relationship.

Because of said longitudinal spacing and phase relationship, for instance, some transversal partition elements can be introduced from the bottom upwards, from a slot 30 opened between the sliding surface 7 and the conveyor 8, as described in the above mentioned patent application. One can also, for instance, introduce said partition elements from a group side or from its top, by means of different introducing apparatuses, not shown and not described because they are not related with the object of the present invention.

Each transversal rank 2a of articles 2 of each group 100, 200 and so forth, is then moved downstream over and beyond the sliding surface 7 until it reaches the conveyor 8, moving at a slightly lower speed with respect to bars 12a.

When bars 13a pushing each group 100, 200 and so forth, have respectively transferred the heading transversal rank 2aa and the intermediate transversal rank 2ab on said conveyor 8, they are routed upwards because the internal chains 18, 18a are driven back by wheels 21 and 21a, so that said heading rank 2aa and intermediate rank 2ab of articles continue their downstream move by means of conveyor 8.

In this phase each group, for instance group 300, is only affected by a respective bar 12a which, because it moves at a higher speed than conveyor 8, provides to longitudinally accumulate the transversal ranks 2aa, 2ab, 2ac with a very small longitudinal sliding between articles 2 and belts 8a. Furthermore, that longitudinal approaching and leaning comes gently, thus avoiding any violent bump between the articles 2.

Regarding the operating synchronisation of the conveyors 12 and 13 and of the remaining parts of the above described machine, the synchronising means can be of several kinds, e.g. mechanical, electrical, electronic or computerised, and they can easily be carried out by a skilled engineer; for this reason they are not described here.

Referring to the configuration of each group 100, 200, 300 and so on, it must be pointed out that it is possible to provide, between two consecutive thrust bars 12a, 12a, a higher or lower number of bars 13a belonging to the second conveyor 13, related to the number of the articles group transversal ranks to be obtained.

It must also pointed out that the transport path as configured according to the above description relates to a particular machine configuration, but that it is possible to provide for different configurations, according to specific operating requirements, but again using the device of the present invention.

The present description has been given for exclusively illustrative and non limiting purposes, and it is therefore obvious that all changes or variants can be applied to that description, which are suggested by any practical application of the invention and these are included within the scopes of the following claims.

I claim:

1. A device for aligning and/or for spacing out and for longitudinally accumulating ranks (2a) of transversely arranged articles (2), particularly, suitable to be used in packaging lines for packaging cans, bottles and similar articles (2), characterized in that it comprises: first driven transversal thrust bars (12a), fit to affect and push the transversal ranks (2ac) located upstream of each group (200) of said articles (2) along a pushing path extending upstream to downstream in said device; second driven transversal thrust bars (13a), fit to affect and push the remaining transversal ranks (2ab, 2aa), towards the groups (200) ahead, along a first stretch of pushing path, located in the operating area of the path of said first bars (12a); in that along said first stretch of pushing path the respective longitudinally spaced transversal ranks (2ac, 2ab, 2aa) of each group (200) are pushed by means of said first and second transversal bars (12a, 13a, 13a), and in that, after said first stretch of pushing path, said second thrust bars (13a) are led to stop pushing the respective transversal ranks (2ab, 2aa), in a way that said first thrust bars (12a) push the upstream transversal ranks (2ac) of each group (200) against the remaining transversal ranks (2ab, 2aa), thus longitudinally accumulating said group (200).

2. A device according to claim 1, characterized in that said first thrust bars (12a) move in a first, longitudinally extending, closed loop vertical orbit, whose lower branch defines the mentioned pushing path extending upstream to downstream of the same first thrust bars (12a); in that said second thrust bars (13a) move in a second longitudinally extending, closed loop vertical orbit, whose lower branch defines said first stretch of pushing path for the same second bars (13a), located in the operating area of the pushing path of said first bars (12a).

3. A device according to claim 2, characterized in that said first and second orbit have a common stretch oriented from above downwards and upstream to downstream, wherein said first and second thrust bars (12a, 13a) of said first and second conveyors (12, 13) are moved such that said respective bars (12a, 13a) are introduced between the articles (2) located on the transport plane.

4. A device according to claim 3, characterized in that the upstream end of said pair of conveyors (12, 13) is provided with a first common support lower shaft (28), supporting a double pair of wheels (17, 22; 17a, 22a) on which said belts or chains (31, 18; 31a, 18a) of the mentioned conveyors are wrapped.

5. A device according to claim 4, characterized in that the upstream end of said pair of conveyors (12, 13) is provided with a second common support shaft (23), supporting a double pair of wheels (14, 19; 14a, 19a) on which said belts or chains (31, 18; 31a, 18a) of said conveyors (12, 13) are wrapped.

6. A device for aligning and/or for spacing out and for longitudinally accumulating ranks (2a) of transversely arranged articles (2), particularly suitable for use in packaging lines for packaging cans, bottles and similar articles (2), characterized in that it comprises: first driven transversal thrust bars (12a), fit to affect and push the transversal ranks (2ac) located upstream of each group (200) of said articles (2) along a pushing path extending upstream to downstream in said device; second driven transversal thrust bars (13a), fit to affect and push the remaining transversal ranks (2ab, 2aa), towards the groups (200) along a first stretch of pushing path, located in the operating area of the path of said first bars (12a); in that along said first stretch of pushing path, the respective longitudinally spaced transversal ranks (2ac, 2ab, 2aa) of each group (200) are pushed by means of said first and second transversal bars (12a, 13a, 13a), and in that, after said first stretch of pushing path, said second thrust bars (13a) are led to stop pushing the respective transversal ranks (2ab, 2aa), such that said first thrust bars (12a) push the upstream transversal ranks (2ac) of each group (200) against the remaining transversal ranks (2ab, 2aa), thus longitudinally accumulating said group (200);

wherein said first thrust bars (12a) move in a first, longitudinally extending, closed loop vertical orbit, whose lower branch defines said pushing path extending upstream to downstream of the same first thrust bars (12a); in that said second thrust bars (13a) move in a second longitudinally extending, closed loop vertical orbit, whose lower branch defines said first stretch of pushing path for the same second bars (13a), located in the operating area of the pushing path of said first bars (12a); and wherein a first conveyor (12) overhangs a plane for transporting articles (2), the conveyor (12) having a pair of trailing belts or chains (31, 31a) wrapped in a closed loop in respective vertical planes and fit to lead said first thrust bars (12a) to move along said first closed loop vertical orbit; a second conveyor (13) overhanging said plane for transporting article (2), comprising a pair of trailing belts or chains (18, 18a) wrapped in a closed loop in respective vertical planes and able to lead said second thrust bars (13a) to move along said second closed loop vertical orbit.

7. A device according to claim 14, characterized in that said first and second orbit have a common stretch oriented from above downwards and upstream to downstream, wherein said first and second thrust bars (12a, 13a) of said first and second conveyors (12, 13) are moved such that said respective bars (12a, 13a) are introduced between the articles (2) located on the transport plane.

8. A device according to claim 6, characterized in that said chains (18, 18a) wrapping vertical planes of said second conveyor (13) are arranged between said chains (31, 31a) wrapping vertical planes of said first conveyor (12).

9. A device according to claim 6, characterised in that the upstream end of said pair of conveyors (12, 13) is provided with a first common support lower shaft (28), supporting a double pair of wheels (17, 22; 17a, 22a) on which said belts or chains (31, 18; 31a, 18a) of said conveyors are wrapped.

10. A device according to claim 6, characterised in that the upstream end of said pair of conveyors (12, 13) is provided with a second common support shaft (23), supporting a double pair of wheels (14, 19; 14a, 19a) on which said belts or chains (31, 18; 31a, 18a) of said conveyors (12, 13) are wrapped.

11. A device according to claim 6, characterised in that a plane for article transport located downstream of the sliding surface (7) is formed by a tape conveyor (8), driven at a longitudinal speed lower than the longitudinal speed of said first thrust bars (12a).

12. A device according to claim 8, characterized in that the upstream end of said pair of conveyors (12, 13) is provided with a first common support lower shaft (28), supporting a double pair of wheels (17, 22; 17a, 22a) on which said belts or chains (31, 18; 31a, 18a) of said conveyors are wrapped.

13. A device according to claim 8, characterized in that the upstream end of said pair of conveyors (12, 13) is provided with a second common support shaft (23), supporting a double pair of wheels (14, 19; 14a, 19a) on which said belts or chains (31, 18; 31a, 18a) of said conveyors (12, 13) are wrapped.

14. A device according to claim 9, characterized in that the upstream end of said pair of conveyors (12, 13) is provided with a second common support shaft (23), supporting a double pair of wheels (14, 19; 14a, 19a) on which said belts or chains (31, 18; 31a, 18a) of said conveyors (12, 13) are wrapped.

* * * * *